United States Patent
Luhmann et al.

[11] Patent Number: 5,154,892
[45] Date of Patent: Oct. 13, 1992

[54] APPARATUS FOR ACHIEVING AND MAINTAINING AN OXYGEN-DEFICIENT INERT ATMOSPHERE WITHIN A TREATMENT CHAMBER

[75] Inventors: Gerhard Luhmann, Essen-Ueberruhr; Theodor Selbach, Essen; Jürgen Jachmann, Herne, all of Fed. Rep. of Germany

[73] Assignee: Th. Goldschmidt AG, Essen, Fed. Rep. of Germany

[21] Appl. No.: 731,504

[22] Filed: Jul. 17, 1991

Related U.S. Application Data

[62] Division of Ser. No. 516,265, Apr. 30, 1990, Pat. No. 5,079,045.

[30] Foreign Application Priority Data

May 2, 1989 [DE] Fed. Rep. of Germany ....... 3914502

[51] Int. Cl.$^5$ .......................... G05D 7/00; B05C 11/00
[52] U.S. Cl. ..................... 422/111; 422/110; 422/119; 422/121; 422/124; 118/65; 118/68; 156/380.9; 219/388
[58] Field of Search ............ 118/65, 68; 219/388; 422/110, 111, 119, 121, 124; 156/380.9

[56] References Cited

U.S. PATENT DOCUMENTS

| | | | |
|---|---|---|---|
| 3,559,965 | 2/1971 | Ishida | 219/388 X |
| 4,336,279 | 6/1982 | Metzger | 219/388 X |
| 4,442,143 | 4/1984 | Reed | 118/68 X |
| 4,444,814 | 4/1984 | Flinchum et al. | 427/378 |
| 4,508,750 | 4/1985 | Föll et al. | 427/54.1 X |
| 4,636,405 | 1/1987 | Mensal et al. | 427/54.1 |

Primary Examiner—James C. Housel
Assistant Examiner—Arlen Soderquist
Attorney, Agent, or Firm—Anderson Kill Olick & Oshinsky

[57] ABSTRACT

A method and apparatus are disclosed for achieving and maintaining an inert atmosphere as oxygen-deficient as possible in a treatment chamber, having a reaction zone, particularly an irradiation chamber, traversed by a length of material, wherein the length of material is supplied to the chamber through an inlet channel and conducted from the chamber through an outlet channel. A circulating inert gas stream, which detaches the entrained gas boundary layer held by the material, is moved countercurrently to the length of material in the inlet channel and is supplemented in a controlled manner with fresh inert gas in such amount that a given maximum oxygen concentration is not exceeded in the reaction zone and the flow rate of the inert gas stream is controlled, so that the pressure before the exit gap of the outlet channel is the same or slightly higher than the surrounding pressure.

11 Claims, 4 Drawing Sheets

APPARATUS FOR ACHIEVING AND MAINTAINING AN OXYGEN-DEFICIENT INERT ATMOSPHERE WITHIN A TREATMENT CHAMBER

This is a division of application Ser. No. 07/516,265 filed Apr. 30, 1990, now U.S. Pat. No. 5,079,045.

BACKGROUND OF INVENTION

This invention is directed to a method for achieving and maintaining an inert atmosphere which is as oxygen-deficient as possible within a treatment chamber. More particularly, this invention is directed to a method wherein an irradiation chamber is traversed by a length of material which is supplied to the chamber through an inlet channel and is conducted from the chamber through an outlet channel and wherein the maximum oxygen concentration in the reaction space is prevented from exceeding 200 ppm and more preferably from exceeding 100 ppm.

This invention is directed also to an apparatus for implementing the aforementioned method.

Supporting sheets coated with cured synthetic resin are used to a considerable extent, for example, as abhesive or release papers. For their preparation, the supporting sheets are generally coated with a radiation-curable polymer, such as an acrylic resin, and subjected to the action of suitable radiation, in order to effect the curing of the polymer. This curing reaction takes place in a very short time, so that lengths of material coated with curable resin can be passed by a suitable source of radiation for the purpose of curing at high speed. Since the free radical polymerization or curing is impeded or prevented by oxygen, it is necessary that the supporting sheets treated with curable resin be supplied to a treatment chamber which has an inert gas atmosphere. However, during the transport of the resin-coated supporting sheet, air is brought into the treatment chamber. Care must be taken, therefore, to ensure that the maximum oxygen concentration of $\leq 200$ ppm of oxygen in the treatment chamber is not exceeded by this entrained air.

SUMMARY OF THE INVENTION

It is an object of the invention to provide a method which permits an inert atmosphere which is as oxygen-deficient as possible to be achieved and maintained in a treatment chamber through which a length of material is passing, so that the entrainment of oxygen into the reaction space that is the site of the radiation-induced polymerization is reliably avoided.

It is a particular object of the invention to provide a method whereby a length of material reaches the treatment chamber with the least possible amount of inert gas but, at the same time, with a high degree of reliability with respect to the presence of as little oxygen as possible.

These and other objects are attained by the method and apparatus of the invention described below.

According to the invention, a method has been discovered for achieving and maintaining as oxygen-deficient an inert atmosphere as possible in a treatment chamber having a reaction zone, particularly an irradiation chamber, through which a length of material is passing, wherein the length of material bearing an entrained gas boundary layer is supplied to the reaction zone through an inlet channel and is conducted from the reaction zone through an outlet channel having an exit gap, which comprises circulating an inert gas stream countercurrently to the passage of the length of material in the inlet channel, which thereby detaches the entrained gas boundary layer, supplementing the inert gas stream in a controlled manner with fresh inert gas in such amount that a predetermined maximum oxygen concentration is not exceeded in the reaction zone and controlling the flow velocity of the inert gas stream, so that the pressure before the exit gap of the outlet channel is the same or slightly higher than the surrounding pressure.

The apparatus of the invention for implementing the method described above which includes a treatment chamber having a reaction zone, an inlet channel communicating with the treatment chamber, an outlet channel communicating with the treatment chamber and transporting and conveying means for moving material to be treated through the inlet channel, treatment chamber and outlet channel and comprising an inert gas outflow chamber in the exit region of the inlet channel, a suction chamber in the entry region of the inlet channel, means for withdrawing gas through the suction chamber, a blocking nozzle between the inert gas outflow chamber and the treatment chamber, means for feeding and for controlling the feed of fresh inert gas through the blocking nozzle, a measurement and control device which controls the pressure at the exit of the outlet channel by influencing the gas flow velocity in the inlet channel, means for feeding fresh inert gas to the reaction zone and a measurement and control device which controls the amount of fresh inert gas metered into the reaction zone as a function of the oxygen content thereof.

DETAILED DESCRIPTION OF THE INVENTION

Figure 1:
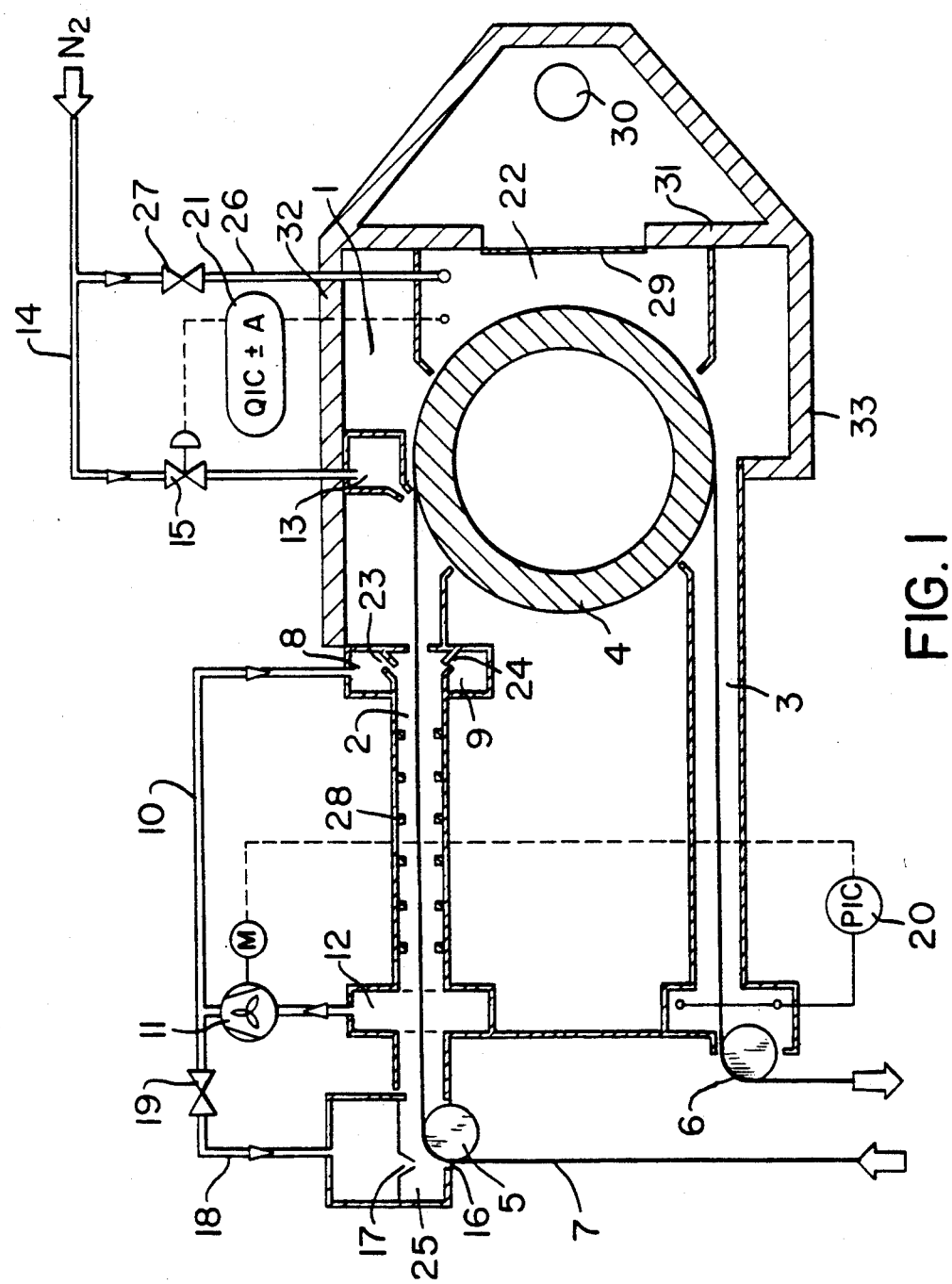
FIG. 1 is a cross section of a basic, overall representation of an embodiment of the apparatus of the invention.

The length of material laden with synthetic resin carries appreciable amounts of air into the inlet channel of the radiation chamber at the high running speeds typically used for this operation, which at the present time may be up to 400 m/min. A portion of this air is transported mechanically by the length of material and a portion remains attached to the length of material as a boundary layer. According to the method of the invention, inert gas is circulated into the inlet channel, which is directed in a stream countercurrently to the length of material transported through the inlet channel. In flowing countercurrently to the length of material, the inert gas stream is directed by suitable apparatus in such manner that it detaches the entrained gas boundary layer. Preferably the inert gas is conducted under turbulent flow conditions countercurrently to the length of material in the inlet channel. At the same time, the product of the amount of inert gas and the average velocity of the inert gas must be greater than the product of the amount of gas mixture transported by the length of material and the average velocity of this gas mixture. Moreover, fresh inert gas is constantly metered into the inert gas stream in such an amount, that a given maximum oxygen concentration is not exceeded in the reaction space. The inert gas, enriched with oxygen, escapes from the inlet channel at the entry gap. This is guaranteed owing to the fact that flow velocity of the circulating inert gas stream is controlled so that the pressure before the exit gap of the outlet channel is equal to or slightly higher than the surrounding pressure outside of the outlet channel. If the pressure at the exit gap of the outlet channel rises more than slightly above that of the surroundings, the flow velocity of the inert gas stream, which is conducted countercurrently to the length of material, is increased in good time. By these means, the pressure at the exit gap decreases and the pressure at the entry gap increases.

In a preferred embodiment of the inventive method, a portion of the circulating inert gas is removed and supplied to a blocking nozzle disposed in the area of the inlet gap. By these means, the oxygen concentration of the gas stream transported by the length of material is reduced even in the region of the entrance to the inlet channel.

In this connection, it may be of particular advantage that the circulating inert gas stream be preceded by a second, separate, circulating inert gas stream by removing a portion of the first circulating inert gas stream and supplying it to a further, preceding, circulating inert gas stream. Those skilled in the art understand that it is particularly advantageous to have a plurality of inert gas streams, which are disposed in tandem and are passed through the inlet channel consecutively.

The inventive method thus enables the oxygen concentration to be lowered reliably in the treatment chamber and reaction zone or irradiation chamber to a specified maximum value.

The method of the invention is carried out advantageously with an apparatus which is also an object of the present invention. With reference to FIG. 1, the apparatus of the invention has a treatment chamber 1, an inlet channel 2 and an outlet channel 3, as well as transporting and conveying means 4, 5 and 6 for the length 7 of material that is to be treated. It is characterized by the provision in the end region of inlet channel 2, of inert gas outflow chambers 8, 9, which are connected to a pipeline 10, in which a fan 11 is disposed. A suction chamber 12, which is located in the inlet region of the inlet channel 2 is also connected to pipeline 10. Between inert gas outflow chambers 8, 9 and treatment chamber 1, a blocking nozzle 13 is provided through which fresh inert gas can be fed by means of feed line 14, in which a control valve 15 is disposed. Also provided are a first measurement and control device 20, which controls the pressure at the exit of outlet channel 3 by influencing the flow rate in the inlet channel 2, and a second measurement and control device 21, which controls the amount of fresh inert gas metered into the reaction space 22 as a function of the oxygen content.

Inlet channel 2 thus has a suction chamber 12 in the inlet region and inert gas outflow chambers 8 and 9 in the exit region. The inert gas is supplied to the inert gas outflow chambers by way of a conveying means (fan 11), drawn off through suction chamber 12 and circulated through pipeline 10. In inlet channel 2, turbulence-generating flow impediments 28, such as turbulence strips, are preferably disposed.

Preferably, the inert gas outflow chambers 8, 9 have nozzles 23, 24, the angle of incidence and/or the cross section of which can be varied and the direction of flow of which is countercurrent to the direction of movement of the length of material. Likewise, the angle of incidence and/or the cross section of the blocking nozzle 13 can be varied.

The pressure at the first exit of outlet channel 3 is regulated by the measurement and control device 20. For this, there are various equivalent technical solutions.

Preferably, the pressure at the exit of outlet channel 3 is controlled by varying the output of fan 11.

As a further preferred regulating means, the pressure at the exit of outlet channel 3 can be controlled by varying the free cross section of flow of inlet channel 2.

A different preferred regulating means involves controlling the pressure at the exit of outlet channel 3 by varying the angle of incidence or the cross section of nozzles 23 and 24.

Accordingly, the first measurement device 20 measures the pressure at the exit of the outlet channel 3 and compares it with the atmospheric air pressure of the surroundings. If the pressure at the exit of outlet channel 3 falls, and the first measurement and control device 20 lowers the output of fan 11 or increases the free cross section of flow of inlet channel 2 or increases the incidence angle of the nozzles 23, 24 and/or decreases their cross section. If the pressure in outlet channel 3 increases, the first measurement and control device 20 increases the output of fan 11 or decreases the free cross section of flow or reduces the angle of incidence of nozzles 23, 24 and/or increases their cross section. Since the set value of the pressure at the exit of outlet channel 3 is to be approximately the same as the surrounding pressure, a steady state equilibrium is thus brought about by means of this control circuit.

Between the inert gas outlet chambers 8, 9 and the treatment chamber 1, a blocking nozzle 13 is provided, through which fresh inert gas can be fed from feed line 14, in which a control valve 15 is disposed. The amount of fresh inert gas which is metered in is controlled by the second measurement and control device 21, which measures the oxygen concentration in the inner reaction space 22. When the set value is exceeded, the control valve 15 is opened. By these means, inert gas emerges through the blocking nozzle 13 and ensures that the predetermined maximum oxygen concentration is maintained. At the same time, a steady state equilibrium is established, that is, approximately the same amount of inert gas is supplied constantly. This amount is a function of the speed of flow of the length of material. Preferably, the blocking nozzle 13 is constructed as a "peeling-away" nozzle. The peeling-away nozzle is constructed in such a way and is at such a distance from the length of material 7 that an epipolar ray leaving the nozzle strikes the surface of the length of material at an oblique angle and peels away the boundary layer of gas adhering to the length of material.

In a preferred embodiment of the apparatus of the invention, an antechamber 25 with a blocking nozzle 17, which is connected with pipeline 10 by way of a pipeline 18, which is supplied with a valve 19, is disposed between the entry gap 16 and suction chamber 12. Even in the entry gap, a gas stream, which has a lower oxygen content than does the air entrained by the supporting sheet, flows countercurrently to the length of material in proportion to the partial gas stream which can flow through the valve 19.

Preferably, an inert gas supply line 26 with valve 27 is provided in the reaction space 22. Through this line, fresh inert gas, which displaces traces of oxygen and at the same time cools the irradiation window 29, can be supplied to the actual reaction space.

Additional and preferred embodiments of the inventive apparatus are described means of FIGS. 2 to 6.

Figure 2:
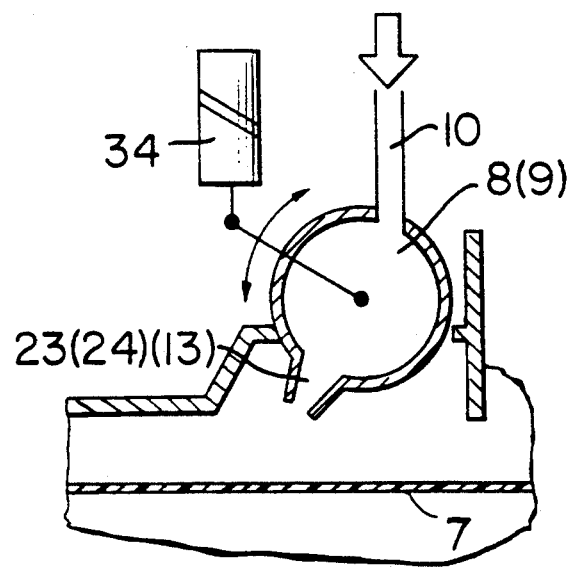
FIGS. 2 and 3 show in cross section preferred embodiments of the inert gas outflow chambers of the apparatus of the invention, with a variable angle of incidence and nozzle cross section.

The embodiment of the invention illustrated in FIG. 2 makes it possible to change the injector action, and thus the flow velocity which is directed against the running direction of the length of material 7 by varying the angle of incidence that the nozzles 23 and, 24 or 13 make with the length of material. For this purpose, the first measurement and control device 20, with the help of the actuating drive 34, rotates the inert gas outflow chambers 8, 9 with the nozzles 23, 24.

Figure 3:
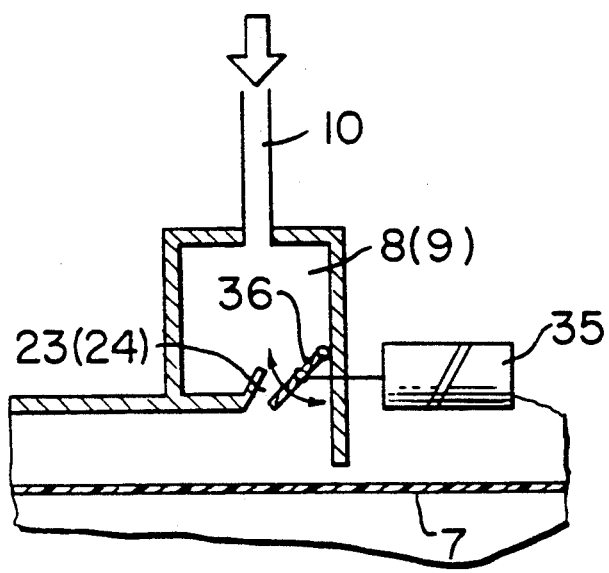

By means of the apparatus illustrated in FIG. 3, an injector effect is brought about by restricting the flow using the butterfly valve 36. At the same time, the circulated flow from line 10 is changed. The butterfly valve 36 is adjusted with the drive mechanism 35, which is controlled by the first measurement and control device 20.

Figure 4:
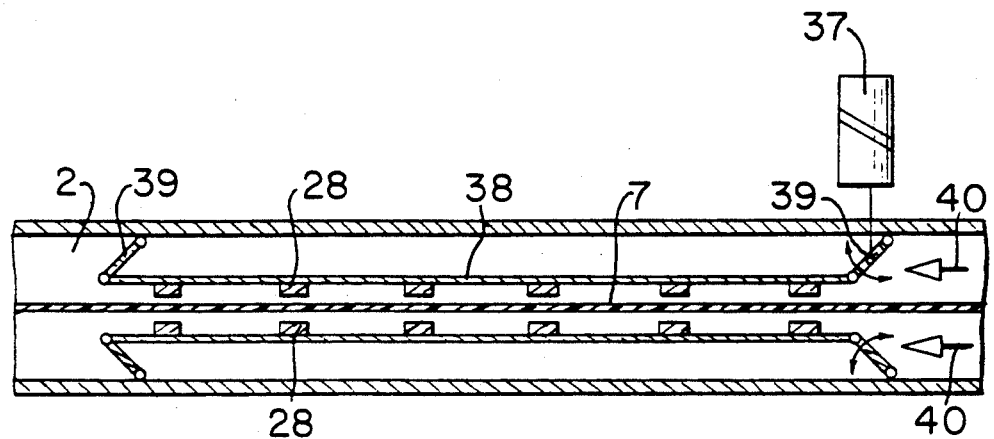
In FIGS. 4 and 5, design solutions for changing the free cross section of flow of the inlet chamber of the apparatus of the invention are shown.

In FIG. 4, an embodiment of the invention is illustrated wherein the free cross sections of flow for the gas streams 40 in the inlet channel 2, which are directed against the length of material 7, are changed. With the driving mechanism 37 and over the articulated flap 38, the first measurement and control device 20 adjusts the distance between the cross sectional boundary 38 and the length of material 7.

Figure 5:
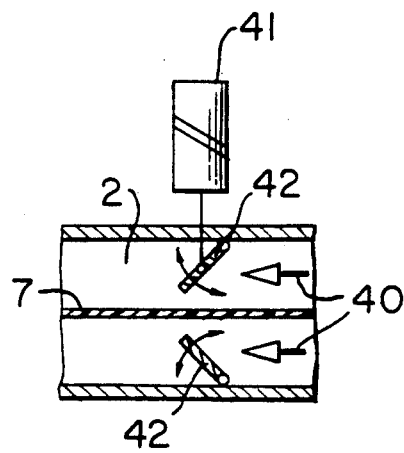

FIG. 5 illustrates another embodiment of the invention wherein the free cross sections of flow for the gas flows 40 are changed through the articulated flaps 42 by the actuating drive 41 through the first measurement and control device 20.

Figure 6:
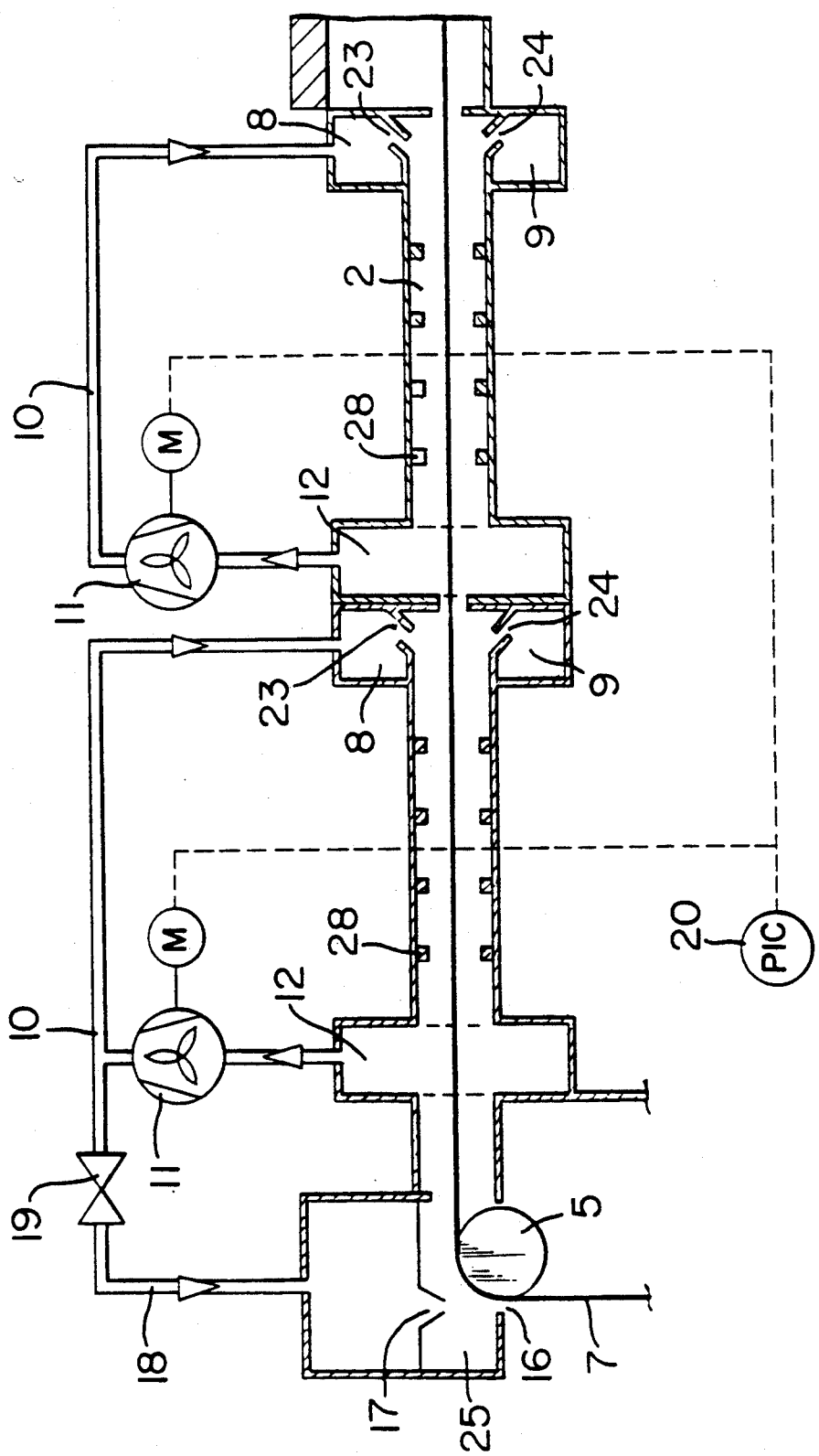
FIG. 6 shows in cross section an arrangement of two inlet chambers in tandem according to a further embodiment of the invention.

In another embodiment of the invention illustrated in FIG. 6, two complete inlet channels 2 are disposed next to one another in cascade fashion. The number of these inlet chambers disposed in cascade fashion can be increased freely. This cascade-like arrangement is provided preferably when the velocity of the length of material is very high and the width of the material is very large. With this arrangement, the oxygen concentration is reduced stepwise from one inlet chamber to the next.

The method of carrying out the invention is described in greater detail below by means of the figures.

In FIG. 1, the treatment chamber 1 has an inlet channel 2 and an outlet channel 3. The length of material 7 passes over a deflection roller 5 into the inlet channel 2 and is guided by cylindrical roller 4 past the irradiation window 29 and leaves the outlet channel 3 over deflection roller 6. The actual reaction space 22 is formed, on the one hand, by the length of material 7 lying on the partial surface are of the cylindrical roller 4, the bounding walls 32, 33 of the chamber and the bounding wall 31; a radiation window 29 is disposed in the bounding wall 31. Opposite the irradiation window, there is a source of radiation 30. The incoming length of material 7 passes first of all through the antechamber 25. A portion of the entrained, adhering air is removed by inert gas, which emerges from blocking nozzle 17. The length of material 7 now passes through the inlet channel 2, which has turbulence-increasing flow obstacles 28. At the same time, inert gas, which is emerging from outflow chambers 8, 9 through nozzles 23, 24, is flowing countercurrently past the length of material 7. In-so doing, the jets from the nozzles 23, 24 detach the air adhering to the surface of the length of material 7 or conveyed by it. The bulk of the inert gas is supplied through pipeline 10 by fan 11 and once again enters the outflow chambers 8, 9. Fresh inert gas is supplied to the blocking nozzle 13 through pipeline 14 and the control valve 15 in proportion to the second set value of the controller 21 for the maximum oxygen concentration. The fresh inert gas supplied to blocking nozzle 13 passes into, with injector effect, the jets coming from the nozzles 23, 24 and is conveyed into the inlet channel 2. By these means, the oxygen content of the flowing gas is reduced further. A flow of gas, corresponding to the inert gas supplied, is discharged at the entry gap 16 of antechamber 25. The length of material is now guided by the cylindrical roller 4 past the radiation window 29 and the polymer on the supporting sheet is cross-linked under the action of the radiation from the radiation source 30. After the curing and after passing through outlet channel 3, the length of material 7 is transported out of the apparatus over deflection roller 6.

A flow of fresh inert gas can be supplied over pipeline 26 to the actual reaction space 22 in an amount adjustable by means of valve 27.

The function of the control circuits becomes clear in a graphic manner by considering the relationships when starting and when operating the apparatus.

When the apparatus of the invention is started, the length of material 7 is first drawn in and, after that, the whole of the treatment area, including inlet channel 2 and outlet channel 3, is flushed with pure inert gas through pipelines 14 and 26. The supply of inert gas is restricted when the second measurement and control site 21 notes that the maximum permissible oxygen concentration in the reaction space 22 has been reached. The driving mechanism for the length of material is now released. The inert gas stream is agitated and circulated by fan 11 through pipeline 10 into the outflow chambers 8, 9, through inlet channel 2 into suction chamber 12 and through pipeline 10 once again to the fan. The length of material 7 is now transported by means of the rollers 4, 5 and 6. As soon as the measurement site 21 indicates a deviation of the target value for oxygen beyond the specified, maximum permissible concentration, fresh inert gas is blown in countercurrently to the length of material 7 through valve 15 and blocking nozzle 13. At the same time, a corresponding amount of oxygen-laden inert gas escapes at the exit gap 16 of inlet channel 2. In the case shown, maintaining the target pressure at the end of the outlet channel 3 is ensured by controlling the transporting velocity of the circulating inert gas stream. By means of these control mechanisms, it is ensured that, independent of fluctuations in the running speed and of the amount of air entrained by the length of material 7, the permissible maximum oxygen concentration in the reaction space 22 is not exceeded and the state of equilibrium within the apparatus is maintained automatically by means of these control mechanisms.

By these means, the principal objective of the invention, namely adjusting and maintaining the oxygen content in a reaction chamber, is achieved with minimum quantities of inert gas.

The following example further illustrates the best means currently contemplated for carrying out the invention, but must not be construed as limiting the invention in any manner.

EXAMPLE

An apparatus is used in which the treatment chamber 1, inlet and outlet channels 2 and 3 and rollers 4, 5 and 6 have a width of 1.70 m. The gaps at inlet and outlet channels 2, 3 have a clear width of 5 mm. The apparatus is flushed with oxygen-free nitrogen over pipeline 14 and valves 15 and 27. Subsequently the length of material 7 is drawn into the apparatus. After that, the fan 11 is turned on. As a result, the nitrogen is circulated from the suction chamber 12 over the fan 11, the pipeline 10, the outflow chambers 8, 9, the nozzles 23, 24 and the inlet channel 2. At the same time, a reduced pressure is developed in the treatment chamber 1 and correspondingly at the end of the outlet channel 3. The first measurement and control device 20, which controls the pressure, now lowers the output of the fan 11, until the pressure has equalized. The length of material 7 is now brought to a traversing velocity of 300 m/min by the conveying equipment. By increasing the output of the fan 11, the first control device 20 counteracts the pressure that is increasing at the exit gap of outlet channel 3 due to the entrainment action of the length of material. By these means, a steady state equilibrium is developed at a nominal excess pressure of 0.1 $N/m^2$ with a regulating accuracy of $\pm 0.075$ $N/m^2$. The average outflow velocity of the nitrogen at the exit gap of the outlet channel 3 is 0.4 m/s. The nitrogen losses thus are 12 to 15 $m^3/h$.

Because of the entrainment action of the length of material 7 in the outlet channel 3, a pressure that is lower by about 10 $N/m^2$ develops in the treatment chamber 1. The total pressure, which results from this lower pressure and the pressure which the length of material 7 produces in the inlet channel 2 due to the entrainment action, is compensated for by the amount and the velocity of the circulated nitrogen. Nitrogen is added over pipeline 14 with valve 27, control valve 15 and nozzle 13 in such an amount, that 15 to 20 $m^3/h$ of nitrogen emerge at the inlet gap of the inlet channel 2. The total consumption of nitrogen thus is 27 to 35 $m^3/h$.

In a treatment chamber of the state of the art, that is, one in which the pressure is not controlled and the nitrogen is not circulated, about 300 to 360 $m^3/h$ of nitrogen are consumed for lengths of material of the same dimensions.

We claim:

1. In an apparatus for producing and maintaining an oxygen-deficient inert atmosphere in a treatment chamber comprising a treatment chamber having a reaction zone, wherein an inlet channel communicating with the treatment chamber, an outlet channel communicating with the treatment chamber and transporting and conveying means for moving material to be treated through the inlet channel, treatment chamber and outlet channel are provided, the improvement comprising:

an inert gas outflow chamber in an exit region of the inlet channel;

a suction chamber in an entry region of the inlet channel;

means for withdrawing gas through the suction chamber in communication with the inert gas outflow chamber;

a blocking nozzle between the inert gas outflow chamber and the treatment chamber;

means for feeding and for controlling the feed of fresh inert gas through the blocking nozzle;

first measurement and control means for controlling the pressure at an exit of the outlet channel by controlling the gas withdrawing means such that gas flow velocity in the inlet channel is adjusted;

means for feeding fresh inert gas to the reaction zone; and second measurement and control means for controlling the amount of fresh inert gas metered through said blocking nozzle as a function of the oxygen content in the reaction zone.

2. The apparatus of claim 1, in which the inert gas outflow chamber has nozzles which have at least one of a changeable angle of incidence and a changeable cross section, the nozzles further having a gas flow direction that is countercurrent to a direction of movement of the material.

3. The apparatus of claim 1, in which the means for withdrawing gas through the suction chamber includes a fan, pressure at the exit of the outlet channel being controlled by changing the output of the fan.

4. The apparatus of claim 1, in which the first measurement and control means includes means for changing a transverse cross section of the inlet channel for controlling the pressure at the exit of the outlet channel.

5. The apparatus of claim 1, in which the inert gas outflow chamber has nozzles, the outflow chamber nozzles having an angle of incidence that is changeable so as to control the pressure at the exit of the outlet channel.

6. The apparatus of claim 1, in the which the inert gas outflow chamber has nozzles, the outflow chamber nozzles having cross sections that are changeable so as to control the pressure at the exit of the outlet channel.

7. The apparatus of claim 1, in which the blocking nozzle is a peeling-away nozzle.

8. The apparatus of claim 1, in which turbulence-generating flow obstacles are disposed in the inlet channel.

9. The apparatus of claim 1, which further comprises an antechamber disposed between the entry of the inlet channel and the suction chamber, said outer chamber being provided with a blocking nozzle which is connected to a pipeline provided with a valve in communication with the means for withdrawing gas through the suction chamber.

10. The apparatus of claim 1, in which the means for feeding fresh inert gas to the reaction zone includes an inert gas supply line is provided in the reaction zone and having a valve.

11. The apparatus of claim 1 in which the reaction zone comprises an irradiation chamber.

* * * * *